US012438562B2

(12) United States Patent
Wang et al.

(10) Patent No.: US 12,438,562 B2
(45) Date of Patent: Oct. 7, 2025

(54) MULTIPLEXER AND METHOD FOR COMBINING RADIO FREQUENCY DATA

(71) Applicant: Ufi Space co., Ltd., New Taipei (TW)

(72) Inventors: Yu-Min Wang, Taoyuan (TW); Meng-Chiao Lin, Taipei (TW)

(73) Assignee: Ufi Space co., Ltd., New Taipei (TW)

( * ) Notice: Subject to any disclaimer, the term of this patent is extended or adjusted under 35 U.S.C. 154(b) by 328 days.

(21) Appl. No.: 18/358,946

(22) Filed: Jul. 26, 2023

(65) Prior Publication Data

US 2025/0015816 A1  Jan. 9, 2025

(30) Foreign Application Priority Data

Jul. 6, 2023 (TW) ................. 112125208

(51) Int. Cl.
*H04B 1/00* (2006.01)
*H04B 1/04* (2006.01)

(52) U.S. Cl.
CPC .......... *H04B 1/0057* (2013.01); *H04B 1/0458* (2013.01)

(58) Field of Classification Search
CPC ............... H04B 1/3816; H04B 10/077; H04B 10/25253; H04B 10/291; H04B 10/2942; H04B 10/60; H04B 2210/074; H04B 2210/258; H04B 1/0057; H04B 1/0458; H04B 10/0777; H04B 10/2507; H04B 10/27
USPC ...................................... 455/552.1
See application file for complete search history.

(56) References Cited

U.S. PATENT DOCUMENTS

| | | | |
|---|---|---|---|
| 2002/0154359 A1* | 10/2002 | Tsuda | H04J 14/02216 359/337.13 |
| 2004/0062255 A1* | 4/2004 | Grandemange | H04L 67/1001 370/401 |
| 2023/0017897 A1 | 1/2023 | Jang et al. | |
| 2023/0023553 A1 | 1/2023 | Jang et al. | |
| 2023/0088205 A1 | 3/2023 | Lourdu Raja et al. | |

OTHER PUBLICATIONS

"Office Action of Taiwan Counterpart Application", issued on Mar. 12, 2024, p. 1-p. 6.

* cited by examiner

*Primary Examiner* — Ajibola A Akinyemi
(74) *Attorney, Agent, or Firm* — JCIPRNET

(57) ABSTRACT

A multiplexer and a method for combining radio frequency (RF) data are provided. The method is described below. The first output management circuit receives first data and second data and determines whether a first power of the first data and a second power of the second data match a default rule. The first output management circuit output first output data including the second data to a combine circuit coupled to the first output management circuit in response to the first power and the second power not matching the default rule. The combine circuit receives multiple output data from the output management circuits respectively and combines the output data to output combined RF data. The output management circuits include the first output management circuit. The output data includes the first output data.

10 Claims, 5 Drawing Sheets

MULTIPLEXER AND METHOD FOR COMBINING RADIO FREQUENCY DATA

CROSS-REFERENCE TO RELATED APPLICATION

This application claims the priority benefit of Taiwan application serial no. 112125208, filed on Jul. 6, 2023. The entirety of the above-mentioned patent application is hereby incorporated by reference herein and made a part of this specification.

BACKGROUND

Technical Field

The disclosure relates to a technology for combining radio frequency (RF) data, and more particularly, to a multiplexer and method for combining RF data.

Description of Related Art

In the O-RAN.WG4.CUS.0-vXX.XX specification, a cell shared function supported by the fronthaul multiplexer (FHM) mode is defined. In this function, the FHM may transmit and receive packets/messages named "O-RAN option split 7.2X", which are commonly known as evolved common public radio interface (eCPRI) messages. Typically, eCPRI messages may include both control plane messages and user plane messages.

FIG. 1A is a schematic view of a downlink operation of conventional FHMs. In FIG. 1A, an FHM 12 is connected between a distributed unit (DU) 11 and N (where N is a positive integer) radio units (RU) 131~13N. The DU 11 is, for example, a DU in the open radio access network (O-RAN) configuration, while the RUs 131~13N is, for example, RUs in the O-RAN configuration, but it is not limited thereto.

During the downlink operation of the FHM 12, after receiving the message M0 (e.g., eCPRI message) from the DU 11, the FHM 12 duplicates the eCPRI message M0 into N copies, M1~MN, and transmits the messages M1~MN to the RUs 131~13N, respectively.

FIG. 1B is a schematic view of an uplink operation of conventional FHMs. In FIG. 1B, the FHM 12 receives corresponding messages M1'~MN' (e.g., eCPRI messages including user plane messages) from each of the RUs 131~13N and obtains the required RF data from each of the messages M1'~MN'. The messages M1'~MN' correspond to the same radio resource unit. Subsequently, the FHM 12 combines and compresses the RF data obtained from the messages M1'~MN' into a message M0' (e.g., eCPRI message) and uploads the message M0' to the DU 11. However, in response to the power of the messages received by each of the RUs 131~13N being too high, the combining process of the RF data may result in overflow and data loss.

FIG. 2 is a schematic view of an uplink operation of conventional FHMs and a user equipment (UE). It is assumed that the RU 131 has a coverage 21, the RU 132 has a coverage 22, and the RU 133 has a coverage 23. The FHM 12 may receive uplink data from a UE 14 through the RUs 131~133. Generally, to avoid signal attenuation, in response to the UE 14 being at an edge of the coverage 21, the UE 14 needs to transmit messages to the RU 131 with higher power. Similarly, in response to the UE 14 being at an edge of the coverage 22, the UE 14 needs to transmit messages to the RU 132 with higher power. Accordingly, in response to the UE 14 being located an overlay area 31 formed by the edges of the coverage 21 and the coverage 22, both the RU 131 and the RU 132 receive high-power messages. Thus, in response to the FHM 12 combining messages from the RU 131 and the RU 132, overflow is likely to occur.

SUMMARY

The disclosure provides a multiplexer and a method for combining RF data, which may solve the above technical problems.

A multiplexer for combining RF data of the disclosure includes multiple output management circuits and a combine circuit. The output management circuits include a first output management circuit. The combine circuit is coupled to the output management circuits. The first output management circuit receives first data and second data and determines whether a first power of the first data and a second power of the second data match a default rule. The first output management circuit outputs first output data including the second data to the combine circuit in response to the first power and the second power not matching the default rule. The combine circuit receives multiple output data from the output management circuits respectively and combines the output data to output combined RF data. The output data includes the first output data.

In one embodiment of the disclosure, the first output management circuit outputs the first output data not including the second data to the combine circuit in response to the first power and the second power matching the default rule.

In one embodiment of the disclosure, the first output management circuit determines that the first power and the second power match the default rule in response to the second power being greater than a first threshold value and an absolute difference between the first power and the second power being less than a second threshold value.

In one embodiment of the disclosure, the first output management circuit receives the first data from a first radio unit and receives the second data from a second radio unit. The first output management circuit determines whether a user equipment is located in an overlay area of a first coverage of the first radio unit and a second coverage of the second radio unit according to the first data. The first output management circuit determines whether the first power and the second power match the default rule in response to the user equipment being located in the overlay area.

In one embodiment of the disclosure, the above-mentioned multiplexer further includes a decompression circuit. The decompression circuit is coupled to the first output management circuit. The decompression circuit receives RF data and determines whether the RF data includes compressed data. The decompression circuit decompresses the compressed data to obtain the first data and transmits the first data to the first output management circuit in response to the RF data including the compressed data.

In one embodiment of the disclosure, the decompression circuit forwards the RF data as the first data to the first output management circuit in response to the RF data not including the compressed data.

In one embodiment of the disclosure, the data includes an evolved common public radio interface message.

In one embodiment of the disclosure, the above-mentioned multiplexer further includes a compression circuit. The compression circuit is coupled to the combine circuit. The compression circuit compresses the combined RF data to generate compressed RF data and outputs the compressed RF data.

In one embodiment of the disclosure, the above-mentioned first data includes in-phase/quadrature data.

A method for combining RF data of the disclosure is described below. The first output management circuit receives first data and second data and determines whether a first power of the first data and a second power of the second data match a default rule. The first output management circuit output first output data including the second data to a combine circuit coupled to the first output management circuit in response to the first power and the second power not matching the default rule. The combine circuit receives multiple output data from the output management circuits respectively and combines the output data to output combined RF data. The output management circuits include the first output management circuit. The output data includes the first output data.

Based on the above, the disclosure may prevent the RF data from being combined with overflow and reduce the loss of data diversity of the combined RF data.

DESCRIPTION OF THE EMBODIMENTS

Figure 1B:
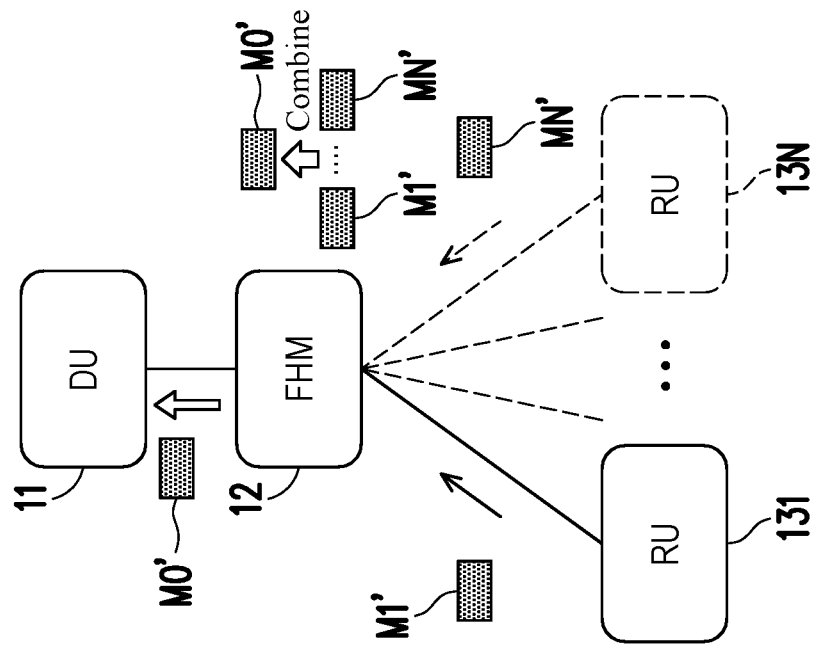
FIG. 1B is a schematic view of an uplink operation of conventional FHMs.
Figure 1A:
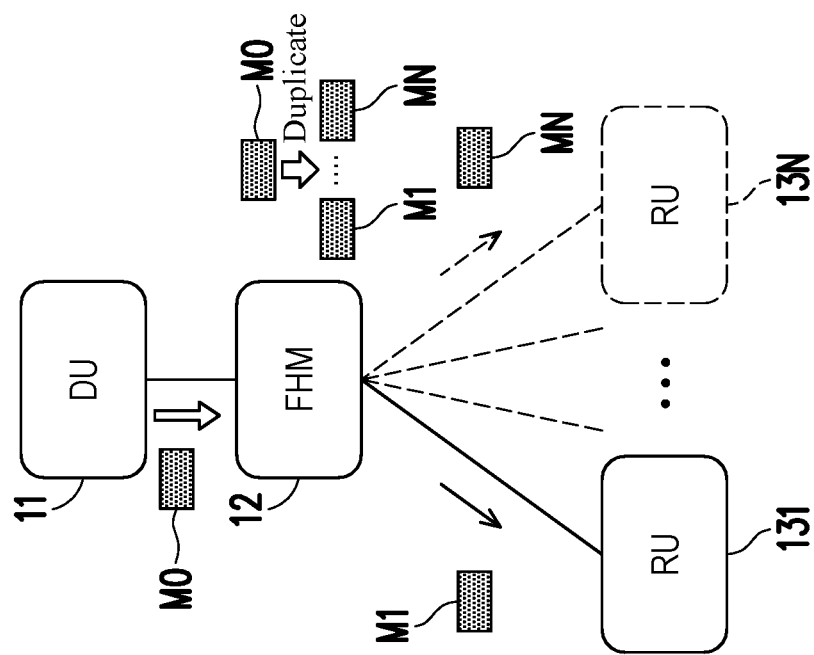
FIG. 1A is a schematic view of a downlink operation of conventional FHMs.
Figure 2:
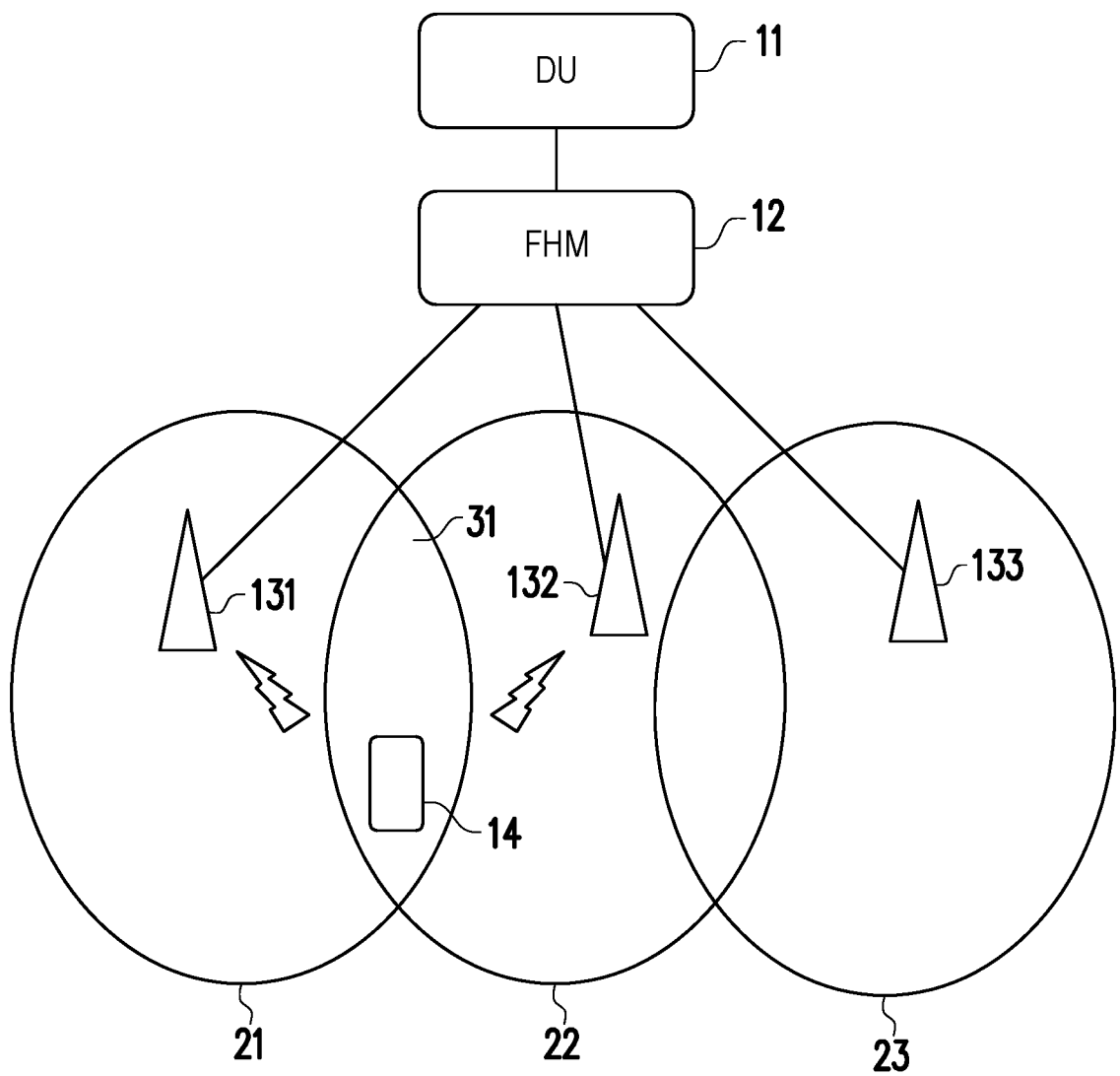
FIG. 2 is a schematic view of an uplink operation of conventional FHMs and a user equipment.
Figure 3:
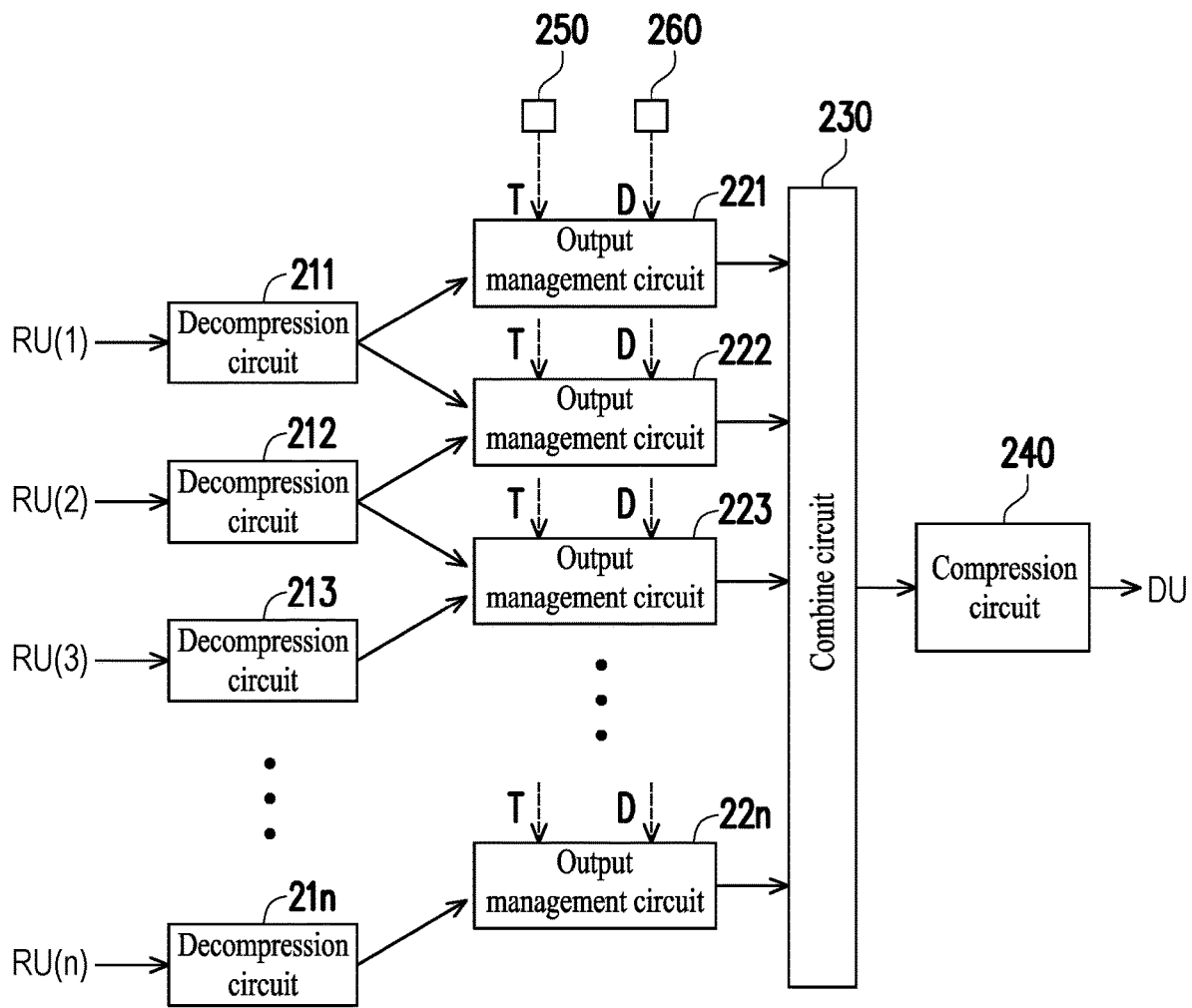
FIG. 3 is a schematic view of a multiplexer for combining RF data according to an embodiment of the disclosure.

FIG. 3 is a schematic view of a multiplexer 200 for combining RF data according to an embodiment of the disclosure. The multiplexer 200 is, for example, an FHM. The multiplexer 200 may include n (where n is a positive integer) decompression circuits (i.e., decompression circuits 211, 212, 213, . . . , 21n), n output management circuits (i.e., output management circuits 221, 222, 223, . . . , 22n), a combine circuit 230, a compression circuit 240, a register 250, and a register 260. n decompression circuits may have the same construction and function, and n output management circuits may also have the same construction and function.

The input terminal of each of the decompression circuits may be used to receive RF data from RUs (e.g., radio units RU(1), RU(2), RU(2), . . . RU(n)), and the output terminal may be coupled to the input terminals of two output management circuits. The RF data is, for example, in-phase/quadrature (IQ) date, and the RF data may include eCPRI message. Specifically, the decompression circuit 211 may receive RF data from the radio unit RU(1) through the input terminal, and the output terminal of the decompression circuit 211 may be coupled to the input terminal of the output management circuit 221 and the input terminal of the output management circuit 222. Similarly, the decompression circuit 212 may receive RF data from the radio unit RU(2) through the input terminal, and the output terminal of the decompression circuit 212 may be coupled to the input terminal of the output management circuit 222 and the input terminal of the output management circuit 223. The decompression circuit 213 may receive RF data from the radio unit RU(3) through the input terminal, and the output terminal of the decompression circuit 213 may be coupled to the input terminal of the output management circuit 223 and the input terminal of another output management circuit (not shown in the figure). The decompression circuit 21n may receive RF data from the radio unit RU(n) through the input terminal, and the output terminal of the decompression circuit 21n may be coupled to the input terminal of the output management circuit 22n and the input terminal of another management circuit (not shown in the figure).

Taking the decompression circuit 211 as an example, the decompression circuit 211 may receive RF data from the radio unit RU(1). The decompression circuit 211 may determine whether the RF data is compressed data. In response to the RF data being the compressed data, the decompression circuit 211 may decompress the RF data and transmit the decompressed data to the output management circuit 221 and the output management circuit 222. On the other hand, in response to the RF data not being the compressed data, the decompression circuit 211 may not decompress the RF data, but directly forwards the RF data to the output management circuit 221 and the output management circuit 222.

The register 250 may be respectively coupled to n output management circuits, and each of the output management circuits may obtain a threshold value T stored in the register 250 from the register 250. The register 260 may be respectively coupled to n output management circuits, and each of the output management circuits may obtain a threshold value D stored in the register 260 from the register 260.

The output terminal of each of the n output management circuits (i.e., output management circuits 221, 222, 223, . . . , 22n) may be coupled to the input terminal of the combine circuit 230. The combine circuit 230 may obtain output data (e.g., output data SO output by the output management circuit 222) from the output terminal of each of the output management circuits. The combine circuit 230 may combine n output data from n output management circuits to generate combined RF data. In one embodiment, the combine circuit 230 may combine n pieces of output data based on the UL combine function recorded in the O-RAN.WG4.CUS.0-vXX.XX specification.

The input terminal of the compression circuit 240 may be coupled to the output terminal of the combine circuit 230. The compression circuit 240 may receive the combined RF data from the combine circuit 230 and compress the combined RF data to generate compressed RF data. The compression circuit 240 may output the compressed RF data. For example, the compression circuit 240 may transmit the compressed RF data to a DU.

Figure 4:
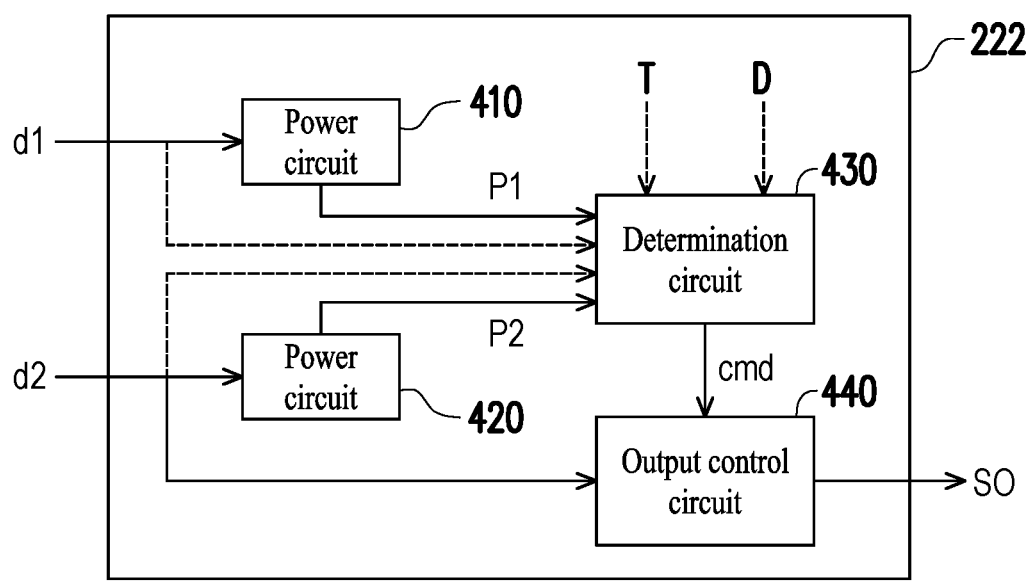
FIG. 4 is a schematic view of an output management circuit according to an embodiment of the disclosure.

FIG. 4 is a schematic view of an output management circuit 222 according to an embodiment of the disclosure. The output management circuit 222 may include a power circuit 410, a power circuit 420, a determination circuit 430, and an output control circuit 440. The input terminal of the power circuit 410 may be coupled to the decompression circuit 211 and may be used for receiving data d1 (e.g., RF data corresponding to the radio unit RU(1)). The output terminal of the power circuit 410 may be coupled to the input terminal of the determination circuit 430. The power circuit 410 may calculate a power p1 of the data d1 and transmit the power p1 to the determination circuit 430. In one embodiment, $p1=I1^2+Q1^2$ or $p1=(I1^2+Q1^2)^{1/2}$. I1 is an in-phase component of the data d1, and Q1 is a quadrature component of the data d1. On the other hand, the input terminal of the power circuit 420 may be coupled to the decompression circuit 212 and may be used for receiving data d2 (e.g., RF data corresponding to the radio unit RU(2)). The output terminal of the power circuit 420 may be coupled to the input terminal of the determination circuit 430. The power circuit 420 may calculate a power p2 of the data d2 and transmit the power p2 to the determination circuit 430. In one embodiment, $p2=I2^2+Q2^2$ or $p1=(I2^2+Q2^2)^{1/2}$. I2 is an in-phase component of the data d2, and Q2 is a quadrature component of the data d2.

The determination circuit 430 may include multiple input terminals, and the input terminals may be respectively coupled to the output terminal of the power circuit 410, the output terminal of the power circuit 420, the output terminal of the decompression circuit 211, the output terminal of the decompression circuit 212, the register 250, and the register 260. The input terminal of the output control circuit 440 may be coupled to the decompression circuit 212 to receive data d2, and the output terminal of the output control circuit 440 may be coupled to the input terminal of the combine circuit 230 to transmit the output data SO to the combine circuit 230. The output terminal of the determination circuit 430 may be coupled to the output control circuit 440. The determination circuit 430 may control the output control circuit 440 through a command cmd to output the output data SO including or not including the data d2.

Specifically, the determination circuit 430 may receive the power p1 and the power p2 from the power circuit 410 and the power circuit 420 respectively and determine whether the power p1 and the power p2 match the default rule shown in formula (1). In response to the power p2 being greater than the threshold value T, it indicates the possibility of overflow caused by the power p2. Moreover, in response to an absolute difference between the power p2 and the power p1 being less than the threshold value D, it indicates a high correlation or similarity between the data d1 and the data d2.

$$\begin{cases} p2 > T \\ |p2 - p1| < D \end{cases} \quad (1)$$

In response to the power p1 and power p2 matching the default rule, the determination circuit 430 may transmit the command cmd to the output control circuit 440. The output control circuit 440 may transmit the output data SO not including the data d2 to the combine circuit 230 according to the command cmd. The output data SO transmitted by the output control circuit 440 to the combine circuit 230 is, for example, "0" (i.e., the output data SO does not contain any information). On the other hand, in response to the power p1 and power p2 not matching the default rule, the determination circuit 430 may not transmit the command cmd to the output control circuit 440. The output control circuit 440 may transmit the output data SO including the data d2 to the combine circuit 230 in response to not receiving the command cmd. In one embodiment, the output control circuit 440 may be a switch. In response to the output control circuit 440 not receiving the command cmd, the output control circuit 440 may connect the output terminal of the decompression circuit 212 to the input terminal of the combine circuit 230 to transmit the data d2 to the combine circuit 230. In response to the output control circuit 440 receiving the command cmd, the output control circuit 440 may disconnect the connection between the decompression circuit 212 and the combine circuit 230, thereby preventing the data d2 from being transmitted to the combine circuit 230.

In one embodiment, the determination circuit 430 may obtain the position information of the user equipment (e.g., user equipment 14) according to the data d1 or the data d2.

According to the position information, it is determined whether the user equipment is located in an overlay area (e.g., overlay area 31) of a coverage (e.g., coverage 21) of the radio unit RU(1) (e.g., RU 131) and a coverage (e.g., coverage 22) of the radio unit RU(2) (e.g., RU 132). In response to the user equipment being located in the overlay area, it means that the user equipment transmits data d1 and data d2 to the radio unit RU(1) and the radio unit RU(2) with stronger power, and the data d1 and the data d2 have a higher risk of overflow. Accordingly, the determination circuit 430 may determine whether the power p1 of the data d1 and the power p2 of the data d2 match the default rule, and then determine whether to transmit the data d2 to the combine circuit 230. On the other hand, in response to the user equipment being located outside the overlay area, it means that the data d1 and the data d2 have a lower risk of overflow. Accordingly, the determination circuit 430 may not determine whether the power p1 of the data d1 and the power p2 of the data d2 match the default rule. The determination circuit 430 may control the output management circuit 440 to directly forward the data d2 to the combine circuit 230.

Figure 5:
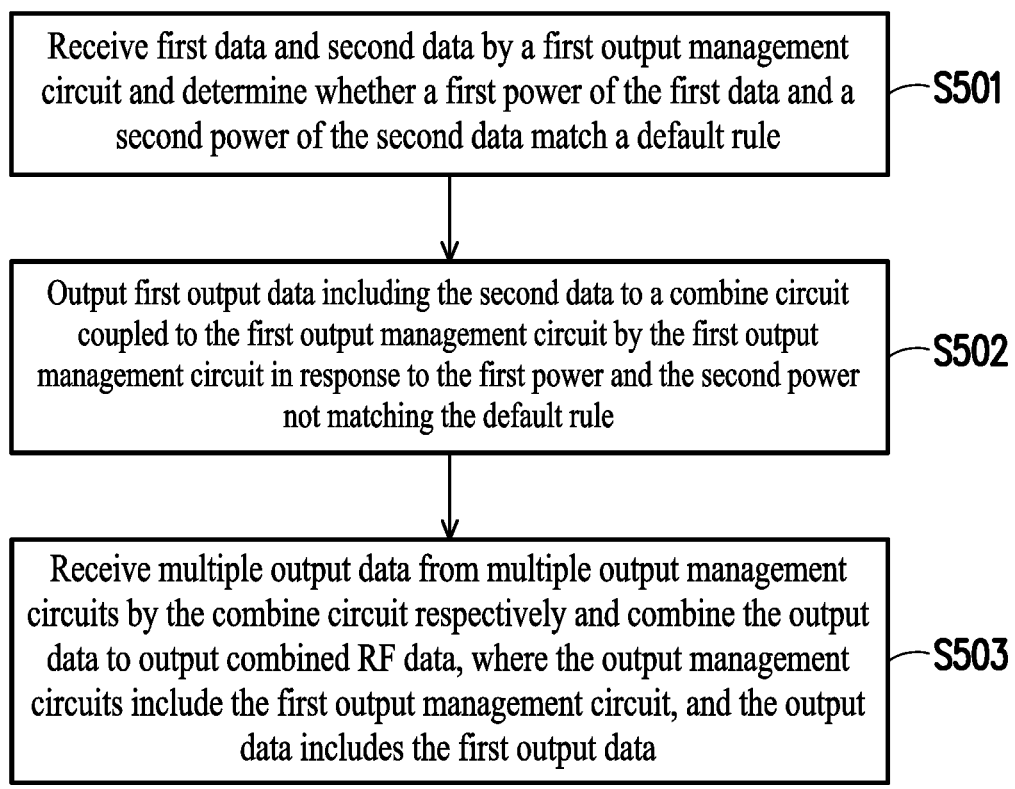
FIG. 5 is a flowchart of a method for combining RF data according to an embodiment of the disclosure.

FIG. 5 is a flowchart of a method for combining RF data according to an embodiment of the disclosure. The method may be implemented by the multiplexer 200 as shown in FIG. 3. In step S501, the first output management circuit receives first data and second data and determines whether a first power of the first data and a second power of the second data match a default rule. In step S502, the first output management circuit output first output data including the second data to a combine circuit coupled to the first output management circuit in response to the first power and the second power not matching the default rule. In step S503, the combine circuit receives multiple output data from the output management circuits respectively and combines the output data to output combined RF data. The output management circuits include the first output management circuit. The output data includes the first output data.

To sum up, the output management circuit in the multiplexer of the disclosure may obtain data from a radio unit and compare the power of the data with the power of data from another radio unit. The output management circuit may determine whether the two data have a risk of overflow and whether the two data are similar according to the compared result. In response to the two data being similar and an overflow may occur, the output management circuit may discard one of the two data. In response to the two data being not similar or an overflow may not occur, the output management circuit may keep the two data. Accordingly, the disclosure may avoid overflow in the period in which multiple output data output by multiple output management circuits are combined and may reduce the loss of data diversity of the combined RF data.

What is claimed is:

1. A multiplexer for combining radio frequency (RF) data, comprising:
   a plurality of output management circuits, comprising a first output management circuit; and
   a combine circuit, coupled to the output management circuits, wherein
   the first output management circuit receives first data and second data and determines whether a first power of the first data and a second power of the second data match a default rule;
   the first output management circuit outputs first output data comprising the second data to the combine circuit in response to the first power and the second power not matching the default rule; and the combine circuit receives a plurality of output data from the output management circuits respectively and combines the output data to output combined RF data, wherein the output data comprises the first output data.

2. The multiplexer according to claim 1, wherein the first output management circuit outputs the first output data not comprising the second data to the combine circuit in response to the first power and the second power matching the default rule.

3. The multiplexer according to claim 2, wherein the first output management circuit determines that the first power and the second power match the default rule in response to the second power being greater than a first threshold value and an absolute difference between the first power and the second power being less than a second threshold value.

4. The multiplexer according to claim 1, wherein the first output management circuit receives the first data from a first radio unit and receives the second data from a second radio unit;
the first output management circuit determines whether a user equipment is located in an overlay area of a first coverage of the first radio unit and a second coverage of the second radio unit according to the first data; and
the first output management circuit determines whether the first power and the second power match the default rule in response to the user equipment being located in the overlay area.

5. The multiplexer according to claim 1, further comprising:
a decompression circuit, coupled to the first output management circuit, wherein the decompression circuit receives RF data and determines whether the RF data comprises compressed data, wherein
the decompression circuit decompresses the compressed data to obtain the first data and transmits the first data to the first output management circuit in response to the RF data comprising the compressed data.

6. The multiplexer according to claim 5, wherein the decompression circuit forwards the RF data as the first data to the first output management circuit in response to the RF data not comprising the compressed data.

7. The multiplexer according to claim 5, wherein the data comprises an evolved common public radio interface message.

8. The multiplexer according to claim 1, further comprising:
a compression circuit, coupled to the combine circuit, wherein the compression circuit compresses the combined RF data to generate compressed RF data and outputs the compressed RF data.

9. The multiplexer according to claim 1, wherein the first data comprises in-phase/quadrature data.

10. A method for combining RF data, comprising:
receiving first data and second data by a first output management circuit and determining whether a first power of the first data and a second power of the second data match a default rule;
outputting first output data comprising the second data to a combine circuit coupled to the first output management circuit by the first output management circuit in response to the first power and the second power not matching the default rule; and
receiving a plurality of output data from a plurality of output management circuits by the combine circuit respectively and combining the output data to output combined RF data, wherein the output management circuits comprise the first output management circuit, and the output data comprises the first output data.

* * * * *